United States Patent [19]

Lim et al.

[11] Patent Number: 4,968,136

[45] Date of Patent: Nov. 6, 1990

[54] RING LASER GYRO AND MAGNETIC MIRROR THEREFOR

[75] Inventors: Wah L. Lim, Santa Ana; V. Warren Biricik, Rancho Palos Verdes; Samuel J. Holmes, Redondo Beach; Frank R. Nakatsukasa, Gardena, all of Calif.; Joseph M. Bresman; Harley A. Perkins, both of Brookline, Mass.; Michael S. Perlmutter, Sherborn, Mass.; Henry T. Minden, Concord, Mass.

[73] Assignee: Northrop Corporation, Hawthorne, Calif.

[21] Appl. No.: 239,724

[22] Filed: Sep. 2, 1988

[51] Int. Cl.⁵ .................... G01C 19/64; G02F 1/05
[52] U.S. Cl. ........................... 356/350; 350/375; 356/351; 372/94; 372/99
[58] Field of Search ............ 356/350, 351; 372/94, 372/99, 106; 350/377, 375

[56] References Cited

U.S. PATENT DOCUMENTS

| | | | |
|---|---|---|---|
| 3,851,973 | 12/1974 | Macek | 356/350 |
| 4,009,933 | 3/1977 | Firester | 372/99 |
| 4,195,908 | 4/1980 | Kestigian et al. | 350/375 |
| 4,201,954 | 5/1980 | Vander Wal et al. | 372/99 |
| 4,442,414 | 4/1984 | Carter | 356/350 X |
| 4,522,496 | 6/1985 | Sanders | 356/350 |

FOREIGN PATENT DOCUMENTS 0267672  5/1988  European Pat. Off. ............ 356/350

Primary Examiner—Vincent P. McGraw
Attorney, Agent, or Firm—Terry J. Anderson; Robert B. Block

[57] ABSTRACT

A laser gyroscope is formed as a sealed, unitary assembly of mirrors optically contacted to a monolithic gyro block without any means, such as Brewster windows, for isolating the laser plasma from any of the mirrors. The mirrors are fabricated with hard multilayer dielectric films which can withstand plasma exposure. A magnetic mirror utilizing the transverse Kerr effect to separate the frequencies of counter-propagating beams, and to avoid lock-in, includes a Ni-Fe alloy layer over which is directly deposited a thin iron or iron alloy layer to form a rotationally switchable Kerr effect combination. The magnetic field for switching is generated by an electric current developed in two pairs of orthogonally disposed wires embedded in the substrate immediately below the iron and Ni-Fe alloy layers. A specially designed multilayer dielectric stack is disposed on one of the mirrors, for example over the iron and Ni-Fe alloy layers on the magnetic mirror, and is configured to suppress S mode oscillation in order to limit the gyro to P mode operation.

51 Claims, 6 Drawing Sheets

RING LASER GYRO AND MAGNETIC MIRROR THEREFOR

BACKGROUND OF THE INVENTION

This invention relates to ring laser gyros and more particularly to such gyros employing magnetic bias and to transverse Kerr magneto-optic effect mirrors useful in such gyros.

Ring laser gyroscopes using magnetic bias commonly include a laser discharge path confining block to which is coupled or attached a plurality of mirrors forming a closed loop (ring) to define an optical cavity for the propagation of counter-propagating laser beams. Such ring laser gyroscopes operate by combining the counter-propagating beams to form an interference fringe pattern. This pattern displays the beat frequency between the counter-propagating beams caused by rotation of the gyro. An output is developed counting movement of the fringe pattern as it passes a detector during gyro rotation. In triangular ring laser gyros, using the transverse Kerr effect magnetic bias, one mirror has had to be mounted externally of the cavity and is coupled to the laser discharge within the cavity through a Brewster angle window. The window suppresses unwanted S-polarized radiation and thereby force the cavity to resonate in the P-polarized radiation mode. However, the use of the window configuration introduces undesirable scattering and birefringence.

For low input rotation rates the coupling caused by scattering locks the frequency of the counter-propagating waves to each other, resulting in beat frequency disappearance in which the fringes used to detect rotation remain stationary despite gyro rotation. In order to avoid lock-in, nonreciprocal phase shifting with magnetic bias has been proposed by such prior art patents as U.S. Pat. No. 3,851,973 and U.S. Pat. No. 3,927,946 in which the frequency of one of the counter-propagating beams is shifted with respect to the other so that they operate away from the lock-in region. This allows the gyro to be operated at angular rotation rates below the usual lock-in threshold.

U.S. Pat. No. 4,442,414 to Carter suggests a magnetic mirror configuration to achieve magnetic bias in which a magneto-optic film is separated from a saturable magnetic material layer by a multilayer stack of dielectric materials. However, the suggestion suffers from inadequate coupling between the magnetic layers resulting from too wide a separation between the saturable magnetic material and the magneto-optic material. This separation diminishes the ability of the magneto-optic material to be switched rotationally between the two magnetization states required for lock-in avoidance. Carter also suggests that the magnetically saturable layer can be switched by conductors lying on the top side of the magnetically saturable layer with a current return path under the magnetically saturable layer. By using this sandwich construction, the drive field is confined almost entirely between the two conductors on the top which carry the current out and the ground layer which carries the current back. Although this configuration reduces inductance, it also tends to limit the spatial extent of the drive field to the magnetically saturable layer. The spaced-apart magneto-optic layer must be driven by the demagnetizing field from the magnetically saturable layer. In this case the magneto-optic layer would have to be switched by magnetic domain wall motion rather than rotationally. In Carter, the magneto-optic layer is covered by dielectric layers made of magnesium fluoride and zinc sulfide which are ill-suited for contact with He-Ne lasing plasma. There is therefore a need for an improved laser gyro and magnetic mirror for use in an operational ring laser gyro which will overcome the above limitations and disadvantages.

SUMMARY OF THE INVENTION

According to the present invention a sealed, unitary gyro assembly includes a monolithic gyro block having a laser cavity generating counter-propagating light beams reflected from a plurality of mirrors optically contacted to the gyro block. The mirrors are fabricated with hard and durable multilayer dielectric films to withstand exposure to the lasing medium and to avoid laser plasma exposure of buried metallic layers. The following terminology is used in this explanation: (a) Bias is the non-reciprocal phase shift introduced in the P-polarization of a light beam; and, (b) non-reciprocal loss is the difference in reflectances from a magneto-optic element of counter-propagating P-polarized light beams.

The gyro of the present invention has an odd number of mirrors and in one embodiment, a small perimeter (less than approximately 30 cm) which results in large frequency spacing between fundamental S-and P-polarized modes in the gyro cavity. When the desired P-mode is tuned to the peak of the gain vs. frequency curve, the position of the adjacent fundamental S mode can be arranged to lie outside of the region of significant gain. The low gain then available for the S mode effectively discriminates against the unwanted fundamental S mode preventing it from lasing.

One of the mirrors in the gyro is a magnetic mirror having a substrate which includes embedded conductors for generating rapidly switchable magnetic fields. A magnetically saturable layer such as a nickel-iron alloy (preferably zero magnetostriction Ni-Fe alloy) is disposed on the substrate. A thin iron or iron alloy magneto-optic layer may be deposited directly on the Ni-Fe alloy layer. A multilayer dielectric stack is placed over the thin iron layer for the purpose of adjusting the non-reciprocal loss to zero and for reflectivity enhancement. The dielectric stack includes alternating layers of a high index of refraction material and a low index of refraction material such as titanium dioxide and silicon dioxide, respectively. In other embodiments, the multilayer dielectric stack forming one or both of the other mirrors is configured for suppressing the fundamental S mode and/or other higher order, off-axis S-polarized radiation which can be closer in frequency to the P-mode than the fundamental S mode. By suppressing the S mode with the small perimeter, odd number of mirrors configuration and/or with multilayer dielectric coatings, the single P-mode operation is achieved without Brewster angle windows and the attendant birefringence problems as well as increased scatter.

The Ni-Fe alloy layer in the magnetic mirror is easily magnetically oriented during manufacture to provide the uniaxial anisotrophy required for a rotational switching technique. Ni-Fe alloy can be rotationally switched with very small external magnetic fields. Its magneto-optic constant is smaller than iron and it has a small non-reciprocal phase shift. The iron layer residing on the Ni-Fe alloy layer has a higher non-reciprocal phase shift but, by itself, requires significantly higher currents to switch and is difficult to prepare with significant unixial anisotropy. The Ni-Fe alloy layer plus iron overcoat layer, in combination, provides both switching by means of small magnetic fields and a high non-reciprocal phase shift. The current conductors for switching the Ni-Fe alloy/iron are located immediately below the Ni-Fe alloy interface and are preferably located in the substrate.

The switching conductors are formed of two orthogonally oriented pairs of wires which rotationally switch the magnetization between the preferred directions defined by the anisotropy.

It is an object and advantage of the present invention that it is magnetically biased without intracavity elements. Intracavity elements which would increase the dead or locking band by scattering the light, and increase the magnetic sensitivity by introducing circular polarization.

It is a further object and advantage of the present invention in that all functions of the laser, other than the production of optical gain, are done either by elements which are outside the cavity or by the mirrors of the laser themselves, including the production of a magnetic bias to avoid lock by the use of a magnetic mirror; the attainment of the correct laser polarization (P polarization) for the production of the magnetic bias; and the reversal or switching of the magnetic bias.

In order to achieve a magnetic bias the laser light must be P polarized. However, the physics of the ring laser are such that the device will spontaneously oscillate in the S mode. Therefore, the laser must include some means of forcing the laser to oscillate in the P mode. Moreover, the design must be such that the laser doesn't also oscillate simultaneously in an S mode. In the present invention, these conditions are achieved without the introduction of intracavity elements by the following procedures taken singly or together.

If the perimeter, L, of the laser is sufficiently short, the frequency separation of the S and P modes (c/2L) will be larger than the frequency range over which the He-Ne discharge produces gain. Therefore, in such a small laser cavity oscillation is possible only either the P mode or the S mode.

The resonant condition of a ring laser with an odd number of mirrors is that the perimeter length be an integral number of half wavelengths. If the integer is even the mode will be S polarized while if the integer is odd the mode will be P polarized. Therefore, the cavity perimeter must be maintained not just at a resonant length, but at a proper length for P mode oscillation.

A normal ring laser gyro is equipped with at least one moveable mirror. A piezoelectric element is employed to move the mirror so as to adjust the perimeter length. The length of this movement is ordinarily only one or two wavelengths of light.

The laser gyro is also equipped with at least one photodetector which can sense the intensity of the laser light. If the perimeter is not correct, the laser will not oscillate and no light will be sensed. A servo system is provided between the photodetector and the piezoelectric element. The system adjusts the voltage on the piezo element so that the signal which is sensed by the detector is a maximum.

In a conventional system the servo loop will lock on the mode with the maximum intensity. This is normally the S mode. In this invention a polarizer is placed in front of the detector. The orientation of the plane of the polarization of the polarizer is parallel to the plane of the laser. Since the light of the S mode is polarized perpendicular to the laser plane it is extinguished by the polarizer. Thus the detector receives radiation only from the P mode, and the servo loop locks only onto the P mode as required by the magnetic mirror.

There are off axis S modes which oscillate at almost the same perimeter lengths as the axial P modes. Simultaneous oscillation in the off axis mode and the desired P mode degrades the ring laser gyro performance.

One method suppressing the off axis modes uses an elliptical aperture which is specially shaped and placed to discriminate against the off axis mode without unduly disturbing (i.e. scattering) the desired axial P mode.

These and other objects and features of the invention will become apparent from the following description and claims when taken in conjunction with the accompanying drawings, of which:

DESCRIPTION OF THE PREFERRED EMBODIMENTS

Figure 1:
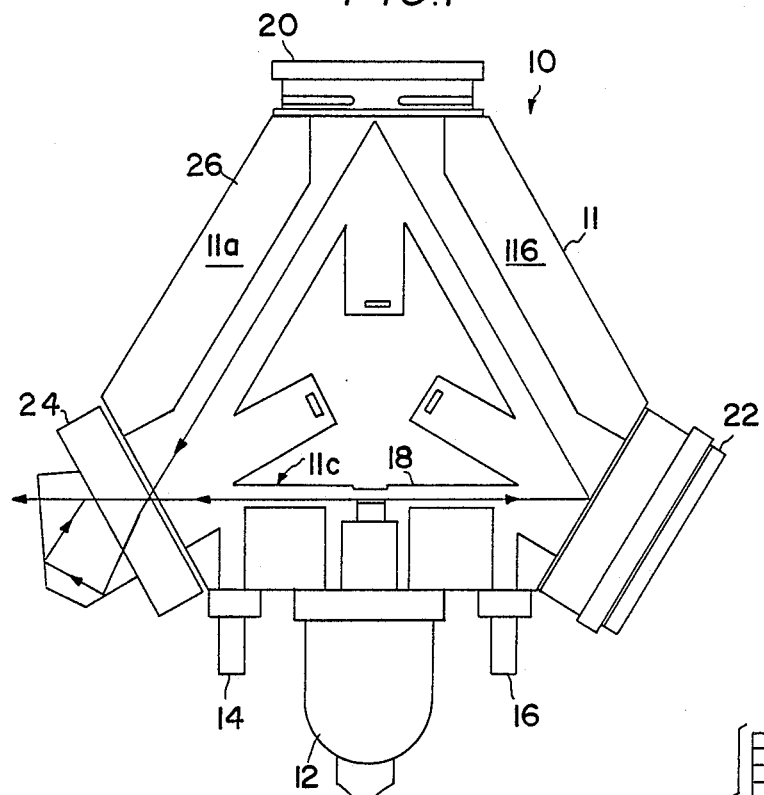
FIG. 1 is a cross-sectional, plan view of the ring laser gyro.

Referring now to FIG. 1, a ring laser gyro 10 of the present invention which includes a block 11 defining a triangular path made by internal bores 11a,b,c to define a small perimeter (15 centimeters) triangular instrument on which three mirrors are mounted at the apexes. A cathode 12 and anodes 14 and 16 combine to generate the discharge in a helium-neon lasing medium. The discharge includes the 1.15 micron wavelength infrared transition of neon. At this wavelength, the helium neon amplifying medium provides approximately twenty times higher gain than available at the more commonly used 0.6328 micron wavelength. The higher gain allows both a small size gyro and one having a single discharge (gain) leg 18. Only the gain leg 18, therefore, requires a precision bore. The small perimeter, triangular configuration produces a large frequency splitting between adjacent S (out of plane) and P (in plane) linearly polarized lasing modes. This simplifies mode control making Brewster windows unnecessary.

Preferably, the gyro is constructed of a block of material such as Zerodur glass which has a low coefficient of thermal expansion to keep the path lengths of the arms of the gyro at a constant value. Zerodur is one example of a glass, or glass ceramic having very low thermal coefficient of expansion and low gas permeability, especially to helium. The triangular configuration of the gyro 10 is defined by three mirrors, namely, a magnetic mirror 20, a path length control mirror 22 and an output mirror 24. P mode operation is maintained by a path length piezoelectric servomechanism (not shown) operating on the path length control mirror 22. The gyro 10 is contacted at the three apexes with the mirrors 20, 22, and 24 to form a sealed, unitary assembly.

Means is provided to operate the gyro 10 with magnetic bias generated by the transverse Kerr effect which requires that the magnetization be perpendicular to the plane of incidence (the plane defined by the ring laser path). This means that the transverse Kerr effect operates only for P-polarized laser light. The ring laser gyro 10 geometry, however, supports both the S- and P-polarized light beams. The S-polarized light beam represents a potential loss of gain and gyro output error and needs, therefore to be eliminated by some means for forcing the gyro to oscillate in the P mode, to the exclusion of the S mode. Prior magnetically dithered ring laser gyros used intracavity Brewster angle windows to eliminate the S-polarized light with the attendant disadvantages discussed above. In the present invention P mode oscillation is achieved without using intracavity elements.

Polarization mode control in the gyro 10 is described as follows. Single, P mode operation can be obtained by suppression of competing S-polarized modes, accomplished through the use of either one or a combination of the following techniques: (a) limit laser cavity perimeter to increase frequency separation of the S and P modes to a value higher than that over which the He-Ne discharge possesses gain; (b) incorporate a piezoelectric moveable mirror, with polarizer and photodetector servo loop, with polarizer parallel to the plane of the laser perpendicular S mode is extinguished so that the detector sees and maximizes a P mode; (c) use a dielectric stack mirror for which reflectance is greater for P mode than for S mode.

The first of the above techniques takes advantage of the large frequency spacing which exists between fundamental S- and P-polarized modes in a small perimeter gyro cavity having an odd number of mirrors. In this case, the fundamental S- and P-polarized modes have a frequency separation given by the expression c/2L, where c is the speed of light and L is the perimeter of the gyro. The frequency spacing in a gyro having a ten centimeter perimeter would be 1500 MHz. This large spacing becomes advantageous when used in combination with the 1.15 micron helium-neon gain vs. frequency distribution which has a width of 1000 MHz. When a P mode is tuned to the peak gain position on the 1.15 micron gain curve, the resulting position of the adjacent S mode lie outside the region having significant gain. The very low gain available effectively discriminates against these S modes, thereby preventing them from lasing.

The above technique is quite effective against competing fundamental S-polarized modes but it does not, by itself, suppress the higher order, off-axis S modes which can be closer in frequency to the P-mode. Elimination of these modes can be accomplished either by aperturing the laser beam to cause significant loss in the off-axis modes and thereby prevent their lasing; or by use of mirrors which use a Fabry-Perot coating stack consisting of two multilayer high reflectance stacks separated by a spacer layer. The design wavelengths of the two multilayer high reflectance stacks are separated with respect to each other, causing an overlap between the transmittance side bands. By properly adjusting the two design wavelengths together with the optical thickness of the spacer layer, a sharp dip in the spectral reflectance is obtained. For a non-normal angle of incidence, this dip in reflectance is split due to polarization. The Fabry-Perot high P, low S mirror configuration is designed to have high P-polarization reflectance and low S-polarization reflectance at the operational wavelength of the ring laser gyro. Of the two techniques for discrimination against higher order S modes, the mirror outlined above is preferable since it does not cause scattering of the laser beam as does the edge of an aperture.

The elimination of Brewster windows used in the prior art requires that the mirrors be in contact with the laser gas discharge which mandates mirror coatings able to withstand such an environment.

The suppression of the S-polarized laser beam may be effected either by an all-dielectric mirror such as the mirror 22 or by the magnetic mirror 20.

Figure 2B:
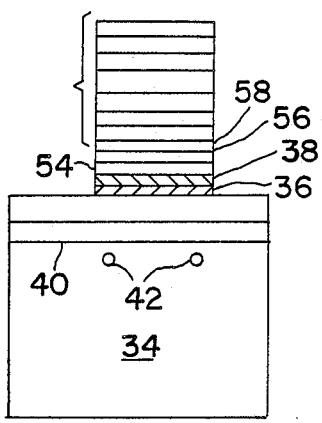
FIG. 2B is a cross-sectional view of the magnetic mirror of FIG. 2A taken along section lines 2—2 thereof.
Figure 2A:
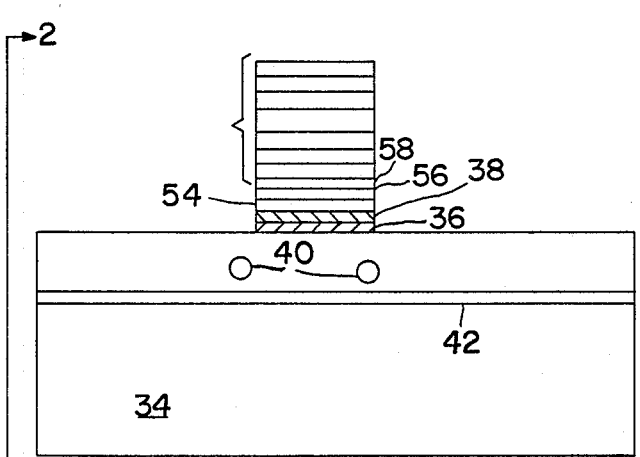
FIG. 2A is a cross-sectional view of a magnetic mirror for use in the gyro of FIG. 1.
Figure 2C:
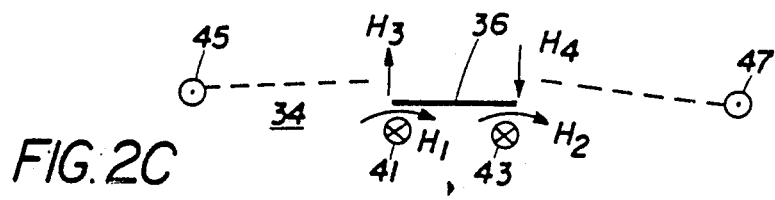
FIG. 2C is a schematic view of conductors in the magnetic mirror of FIG. 2A.
Figure 2D:
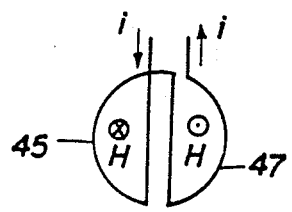
FIG. 2D is a plan view showing the conductors in the mirror of FIG. 2A.
Figure 2E:
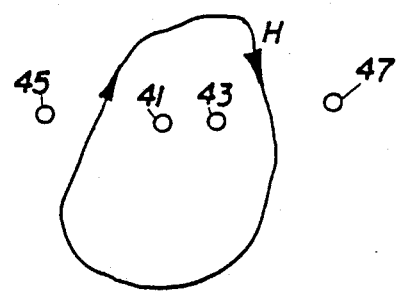
FIG. 2E is a schematic illustration of the spatial extent of the total field generated by the conductors of FIG. 2D.
Figure 3:
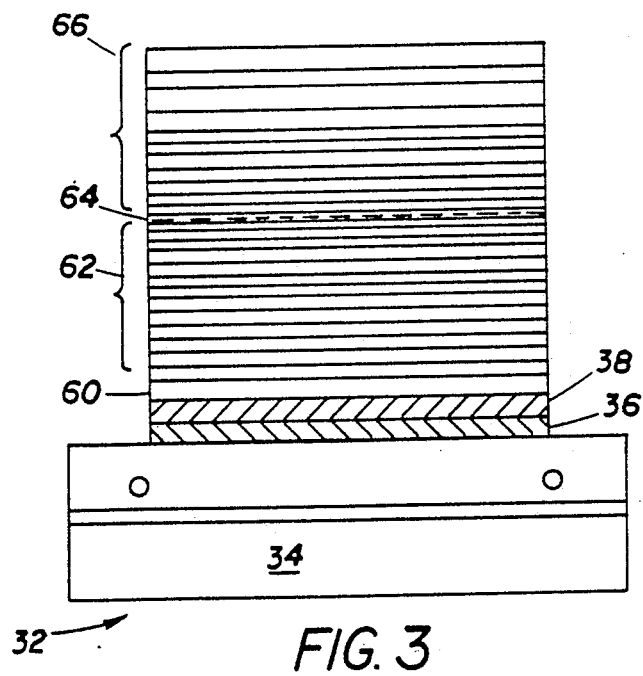
FIG. 3 is a cross-sectional view of a magnetic mirror for the gyro of FIG. 1 incorporating dielectric stacks for suppressing S-polarized radiation.

Magnetic mirrors for use with the gyro 10 will now be described in conjunction with FIGS. 2 and 3. The magnetic mirror 32 of FIG. 3 is constructed to suppress S-polarized light. Each of the magnetic mirrors 20, 30, and 32 includes a substrate 34 on which is deposited an anisotropic magnetic alloy (zero magnetostriction alloy) layer 36 such as Ni-Fe to provide an easy axis magnetization direction. An iron or iron alloy layer 38 may be deposited directly on the Ni-Fe alloy layer 36 for the purpose of increasing the transverse Kerr magneto-optic effect and hence the magnetically induced gyro bias. A typical alloy for the layer 36 is approximately 83% Ni—17% Fe with exact composition adjusted to obtain zero magnetostriction. Zerodur (trademark of Schott Glasswerke) is preferred as a substrate material but other glass or glass-ceramic materials such as Cervit may be used.

Substrate 34 includes two pairs of spaced, parallel electrical conductors 40 and 42 each pair being orthogonally disposed with respect to the other. When energized, the current in the members of each pair flow in the same direction, at any instant and rapidly generate magnetic fields for rotating a magnetization vector in the Ni-Fe alloy layer 36 through +180 degrees or −180 degrees. Rotation is achieved by driving the orthogonal pair for an instant to pull the magnetization vector away from the easy axis, and then reversing the currents in the first pair.

As discussed above, U.S. Pat. No. 4,442,414 teaches a sandwich configuration in which the magnetically saturable layer is located between conductors. Although this configuration reduces inductance, it also tends to limit the spatial extent of the drive field. According to the present invention, inductance of the driving system is minimized without placing the film in the middle of a sandwich which Would make the magneto-optic feature of the film unavailable to the laser beam. The drive conductors are buried under the layer 36 (through the substrate) or just under a thin substrate (such as a diaphragm mirror). The configuration for the pair of conductors 40 is shown in FIG. 2C. The conductor portion 41 and 43 driving the film layer 36 is located about 50-60 mils from the film layer 36 with the generated field in the plane of the film. The return conductor is located at 150-375 mils away from the film edge and approximately in the plane of the film. A top view of this configuration is shown in FIG. 2D. The field from the return conductors 45 and 47 is essentially perpendicular to the film surface which, due to shape anisotropy, has no effect upon the film. The loop inductance of the drive coil is minimized by keeping the area low and by the coupling between the two coils which tends to reduce the spatial extent of the total field from the two halves of the drive coils as shown in FIG. 2E. Although the inductance obtained with the approach of U.S. Pat. No. 4,442,414 may be lower than the typical 150 nanohenries per turn in the magnetic mirrors of the present invention, only a single magnetic turn is required. Multiple turns are easily used in the present approach and even with four turns, inductance is low enough to get 50 nanosecond current rise times.

Magnetic bias serves to break lock when the gyro is at rest. However, when the input rate is equal and opposite to the magnetic bias, locking will still occur. In this case, reversing, i.e. switching as outlined above, the magnetic bias will break lock.

Figure 6A:
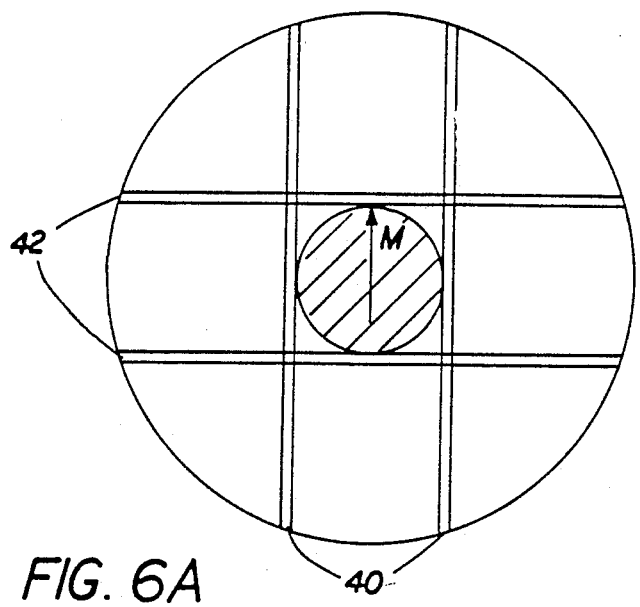
FIGS. 6A and 6B are schematic illustrations of the rotational switching of the magnetic mirrors of FIGS. 2 and 3.

The present invention discloses a coil design in which the wires of the coil themselves are brought into close proximity to the film to be switched. This close proximity allows the generation of a high magnetic field at the film with a relatively small current. The part of the coil which is not near the film provides the return path for the current. The return path parts of the coil are kept sufficiently far from the film so that the magnetic field generated by these parts of the coil does not appreciably cancel the field at the film. In the present design there are two coils arranged perpendicularly to each other. Each coil consists of eight turns divided into two sets of four strands lying on each side laterally and of the mirror center immediately below it. The field producing strands of each coil are perpendicular to each other. The set 40 is perpendicular to set 42 (FIGS. 2A, 2B). One set of strands provides the so-called longitudinal magnetic field, while the other perpendicular set of strands provides the transverse field as described in FIGS. 2C and 2D. The resultant set of coils has the tic-tac-toe arrangement illustrated in FIG. 6A. FIG. 6A also illustrates two pairs of nonintersecting tubes or holes which are drilled in the glass mirror disk. The holes are parallel to the flat face of the mirror; they are 0.050" in diameter, and the holes for the longitudinal coils are 0.050" below the coated surface of the mirror. The transverse holes are perpendicular to the longitudinal holes and preferably below them. The coils are wound in the pattern shown in FIG. 2D. The straight parts of the coils in this figure are threaded through the holes and the curved parts of the coil are wound on the periphery of the mirror.

This particular arrangement of coils was dictated by a desire to induce rotational switching in the anisotropic permalloy film. Rotational switching is the fastest type of magnetic switching. In this mode, all the atomic magnetization of the film rotates in unison.

However, this is not the usual way in which the magnetization of materials is reversed. More frequently, the atomic magnetization will reverse by creation of reverse domains and motion of the walls separating these domains. domain walls are more or less perpendicular to the applied field and to the plane of the film. They advance at a finite velocity across the face of the film depending upon the applied field magnitude. Voids and impurities cause the domain wall velocity to be slower with a given applied field. Moreover, domain walls can get "hung up" on imperfections in the film so that the switching may be incomplete. Rotational switching turns the entire film magnetization as a single domain thereby avoiding domain nucleation and wall motion process.

Permalloy is a unique material in that Permalloy films can be formed with an easy direction of magnetization in the plane of the film, yet the anisotropy is small enough to be useful. This is an ideal condition for rotational switching.

It should be noted, however, that the present disclosure should not preclude the possibility of domain wall switching as a satisfactory alternative for some materials.

Fast switching does require the use of low inductance coils the turns of which are close to the film, preferably are outside of the laser cavity. Additionally, short pulses can be used to switch the film so that the time of switching is well defined; the switching time is short compared to the time of a gyro count; the duty cycle of the magnetic field is small; and the power consumed by switching is small. Rotational switching using the winding pattern described is consistent with these requirements.

The magnetic switching aspects of the magnetic mirrors 30 and 32 will now be discussed in detail in conjunction with FIGS. 2, 3, 5 and 6. The transverse Kerr effect, on which the magnetically dithered gyro 10 operates, requires that the layers 36 and 38 be magnetized perpendicular to the lasing plane. During the deposition of the Ni-Fe alloy and iron layers 36 and 38 the magnetic mirrors 30 and 32 are placed in a unidirectional, uniform magnetic field of fairly high intensity. A magnetic field of approximately 25 to 100 Gauss is used and may be produced by permanent magnets or electromagnets. As the layers 36 and 38 are deposited in a vacuum chamber in the magnetic field, the anisotropy field of the magnetic film tends to align with the external magnetic field producing a uniaxially anisotropic film resulting in a magnetization vector in the plane of the film and perpendicular to the plane of the gyro 10 of FIG. 1. For example, the magnetization vector would be perpendicular to the plane of the paper of FIGS. 2A and 3.

Figure 5A:
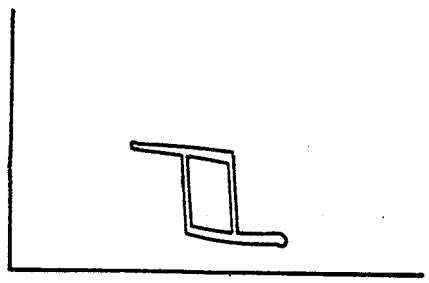
FIGS. 5A and 5B are graphs of hysteresis loops of the iron/permalloy composite film of the magnetic mirror of FIG. 3.
Figure 5B:
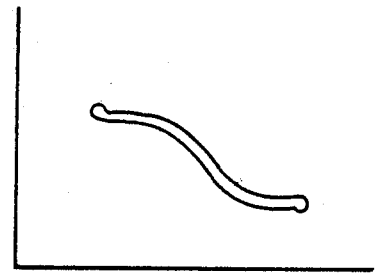

FIG. 6A is a view looking down on the mirrors 30, and shows a magnetization vector M aligned with the pair of conductors 40 and perpendicular to the other pair of conductors 42. The direction of vector M is the so-called "easy axis" of the magnetic film due to the uniaxial anisotropy discussed above. The direction perpendicular to the easy axis M is called the "hard axis". FIGS. 5A and 5B show (B-H) hysteresis loops of the magnetic film. In particular, FIG. 5A shows a rectangular hysteresis curve for the easy axis of M. Mirror orientation indicates the correct magnetization alignment. FIG. 5B shows a closed line (low hysteresis) B-H loop for the hard axis.

Figure 6B:
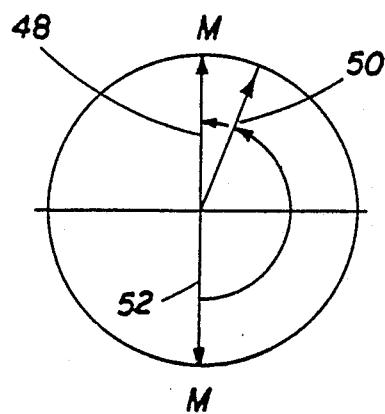

To switch the magnetization vector of the film, current is first established in the conductor pair 42, the pair which provides a field along the easy axis but in a direction to provide a field in the new desired orientation for vector M. The field is typically less than 2.0 Gauss and is smaller than the easy axis coercivity of the film (as determined from an easy axis B-H loop measurement). A typical magneto-motive force (mmf) from the drive winding is 1.2 amp-turns for a 0.25 inch diameter film located within about 0.06 inch from the drive conductors. While this field is present, a current pulse is established in the conductor pair 40, the pair which provides a field perpendicular to the easy axis film direction. A typical field amplitude is greater than 10 Gauss. For example, this causes the film to be switched from position 52 to position 50 shown in FIG. 6B. While the drive field to select the new easy axis polarity is still applied, the drive current which causes the perpendicular field is reduced to zero. In the example of FIG. 6, M moves to position 48. After this occurs, the drive field along the easy axis is also reduced to zero. All of this typically requires about one microsecond, although it could occur faster by increasing the available drive voltage peak from typically 150 volts to a higher voltage or by reducing the typical four turns in the winding to a single turn. Rise time is proportional to the ratio of voltage to inductance. The mirror magnetization vector causes the gyro to have a fixed bias frequency with relative fringe motion in a single direction until the mirror is required to switch to the opposite state. To switch states, the above sequential process is repeated except that the drive field applied along the easy axis is reversed to cause the film to be set to the opposite state (for example, from position 48 to position 52). Note that the field applied perpendicular to the easy axis may have the same polarity to assist in switching the magnetic vector to either direction. Thus, the magnetization could be switched +180 degrees and a half mirror cycle later the magnetization could be switched −180 degrees. The easy axis drive field, $H_e$, amplitude should be $H_k \sin \alpha < H_e < H_c$ where $H_c$ is the coercivity of the easy axis measured with a B-H loop, $H_k$ is the anisotropy field of the magnetic material as measured with a hard axis B-H loop, and $\alpha$ is the dispersion angle of the easy axis (typically 1-2 degrees).

During the deposition of the magnetic films, it is critical that the external field be very uniform. If the external field lines diverge, then different portions of the film will have different easy axes, and, therefore, the required uniaxial anisotropy will not be fully achieved ($\alpha$ will be increased). Because the substrates generally rotate in a planetary fashion during the deposition process to maintain film thickness uniformity, the magnets generating the external field also must rotate. For this reason, permanent magnets are often preferred. The magnets have to be arranged so that as they rotate adjacent magnetic fields do not interfere with one another.

The Ni-Fe alloy layer 36 is subject to stress after it is deposited in a vacuum process, whether it be by ion beam sputtering or vapor deposition. Under such conditions, the uniaxial anisotropy direction can be difficult to maintain if there is a coupling between the stress of subsequent dielectric depositions and the magnetic material. For this reason, a zero magnetostriction alloy is chosen for layer 36.

Mechanically, layer 36 should have low magnetostriction since a stressed dielectric overcoating can affect the magnetostrictive film. The magnetostriction value should be less than about 5 ppm and preferably less than about 1 ppm.

These properties are found in magnetic nickel-iron alloys in the range of from about 80-84 atomic percent nickel (balance iron) and preferably about 83 atomic percent nickel (balance iron) and of low impurity count, when used in films of the appropriate thickness. Generally, the film of layer 36 should be at least 400 Angstroms thick to be effective and no greater than about 2000 Angstroms in order to preserve single domain characteristics. Preferably, the layer 36 may be about 1000 Angstroms thick.

Alternative magnetic material compositions may be substituted. Such materials should possess high magnetic retentivity along the easy axis direction. A different ratio of nickel to iron may be used or a ternary alloy of nickel, iron and cobalt, or binary alloy of cobalt and iron or of cobalt and nickel could be used. For example the alloy Kovar having 29 Ni/54Fe/17Co has been substituted successfully although it requires larger drive fields to switch the film's magnetic states. Also Kovar is more magnetostrictive and thus more subject to altered properties due to stress introduced by the dielectric coating deposited over the magnetic film for the purpose of adequately increasing the mirror's reflectivity. Ideally one would have the easy switching and non-magnetostrictive properties of permalloy (approx. 83% nickel, 17% iron) but with the magneto-optical properties of pure iron. Since the magneto-optic phase shift is primarily accomplished at or near the surface of the magnetic film a more nearly ideal film can be made by overcoating the permalloy layer 36 with a superior magneto-optic layer 38.

Thus, a magneto-optic layer 38 is preferred for use in addition to Ni-Fe alloy layer 36. Layer 38 is deposited on top of the Ni-Fe alloy layer 36 and serves instead as magneto-optic material which generates a greater non-reciprocal phase bias than obtainable from layer 36 alone. Layer 38 can be made of pure iron (99.999%) and may be used in a thickness range of from about 100-200 Angstroms. Preferably, an iron layer 38 is about 120-160 Angstroms thick.

When the preferred layer 38 is used, the combined layers 36, 38 behave magnetically as though made of layer 36, and magneto-optically as though made of layer 38. Furthermore, the intimate contact between the layers 36, 38 is believed to facilitate exchange coupling at the atomic level between the layers 36, 38 so that entire film switches magnetically as though it were entirely made of the material 36.

Iron alloys may also be used for layer 38, as for example, an alloy of iron and cobalt 45+/−5 atomic percent cobalt, balance iron, and having a thickness in the range of from about 100-300 Angstroms. Preferably, this alloy is 55/45 atomic percent Fe/Co.

The layer 38 should also be non-magnetostrictive. Another alternative material for layer 38 is an alloy of silicon and iron, 10+/−5 atomic percent silicon (balance iron) and a thickness in the range of about 100-400 Angstroms. A preferred thickness is about 200-250 Angstroms. This material can be made non-magnetostrictive within the above range.

The magnetic mirror so constructed should have non-reciprocal losses less than about 2 ppm and preferably less than about 1 ppm which can be satisfied with these materials.

By placing the layer 36 in close proximity to the conductors and layer 38 it is found that the magnetic layer 38 is essentially as easy to switch as layer 36 and that non-reciprocal losses are more easily minimized by a matching layer 54, which matches the iron layer 38.

Where layers 36, 38 are constructed of different selected materials, it is found that they form a magnetic composite, interdependent on each other. Both layers have a magnetic and magneto optic effect. Layer 38 has high bias, i.e. phase rotation generates high magneto optic effect; and, also contributes to the switching characteristics. If layer 38 is too thin, there is not enough bias, and if too thick it will be difficult to switch. Accordingly, it is found that an ideal magnetic composite can be achieved satisfying the above conditions and which also exhibits a minimum non-reciprocal loss.

Referring once again to FIG. 2, the magnetic mirror 30 includes multiple dielectric layers to enhance the reflectivity of the mirror. In particular, a phase matching layer 54 of SiO2 having an optical thickness of 0.2303(λ) is deposited on top of the iron layer 38. Next is a layer 56 of TiO2 having an optical thickness of 0.25. The layer 56 is followed by several pairs of alternating TiO2/SiO2 layers beginning with a layer 58 of SiO2. These layers have a 0.25 optical thickness. The reflectivity of the mirror 30 for P-polarized light is approximately 99.4% operating at a wavelength of 1.15 microns. This baseline magnetic mirror 30 does not suppress the unwanted S-polarized light.

The magnetic mirror 32 of FIG. 3 will now be described. Not only does the mirror 32 exhibit magnetooptic properties, but also this mirror suppresses the unwanted S-polarization radiation. This suppression is achieved by multiple layers of dielectric materials. The zero magnetostriction Ni-Fe alloy layer 36 has a film thickness in the range 1,000-2,000 Angstroms. The particular thickness of the Ni-Fe alloy layer depends on the thickness of the iron or iron alloy layer 38. If the iron layer 38 has a thickness in the range of 100-200 Angstroms, the Ni-Fe alloy layer 36 would be approximately 1,000 Angstroms. If the iron layer is thicker, then a thicker Ni-Fe alloy film is required in order to have the uniaxial anisotropy. A matching layer 60 of SiO2 having an optical thickness of 0.0447 is deposited on the iron layer 38. On top of the matching layer 60 are seven pairs of alternating SiO2/TiO2 layers 62 having an optical thickness of approximately 0.2653. A separating layer 64 of TiO2 having an optical thickness of 0.0689 separates the stack 62 from a stack 66 including six pairs of TiO2/SiO2 having an optical thickness of 0.2228. The resulting mirror has high reflectance for P-polarization and lower reflectance for S-polarized light for a wavelength of 1.15 microns at 30 deg. angle of incidence. The thicknesses of the layers must be carefully chosen to keep the non-reciprocal loss very low while achieving a high non-reciprocal bias.

Figure 4:
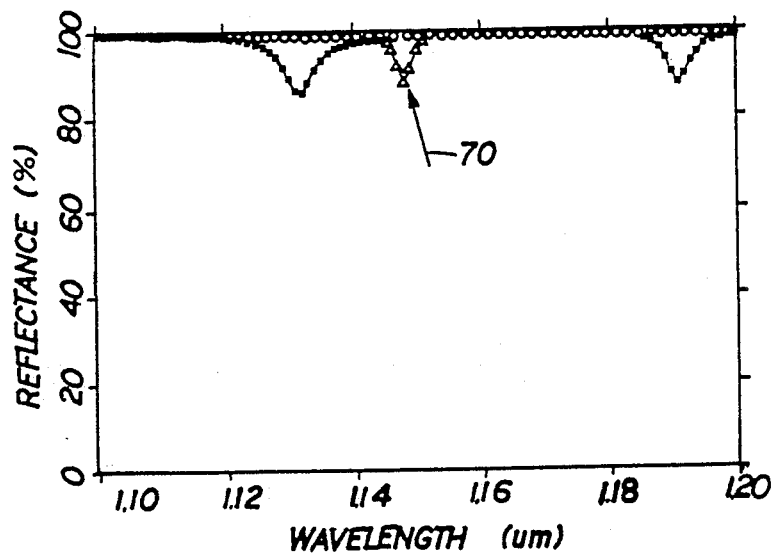
FIG. 4 is a graph of reflectance vs. wavelength for P- and S-polarized light for the magnetic mirror of FIG. 3.

FIG. 4 is a graph of the calculated performance of the magnetic mirror 32 of FIG. 3. The graph shows a drop in reflectance of the unwanted S-polarized light at the operating wavelength indicated by an arrow 70. The curve of interest is for a 30 deg. angle of incidence which is the case for the triangular configuration of the gyro 10 shown in FIG. 1. Because of the dip in S-polarized light, lasing of the S-polarized light will be inhibited and can be eliminated by operating with the proper gain. The magnetic mirror 32 of FIG. 3 has a P-polarized light reflectance of 99.3% which is close to the performance of the magnetic mirror of FIG. 2. The mirror 32 has a non-reciprocal bias of 29 microradians and a non-reciprocal loss of less than 0.10 parts per million. The non-reciprocal bias is a measure of the phase shift introduced by the magnetic mirror between the counter-propagating beams in the gyro for the purpose of avoiding lock-in when the gyro angular rotation is low.

Figure 7:
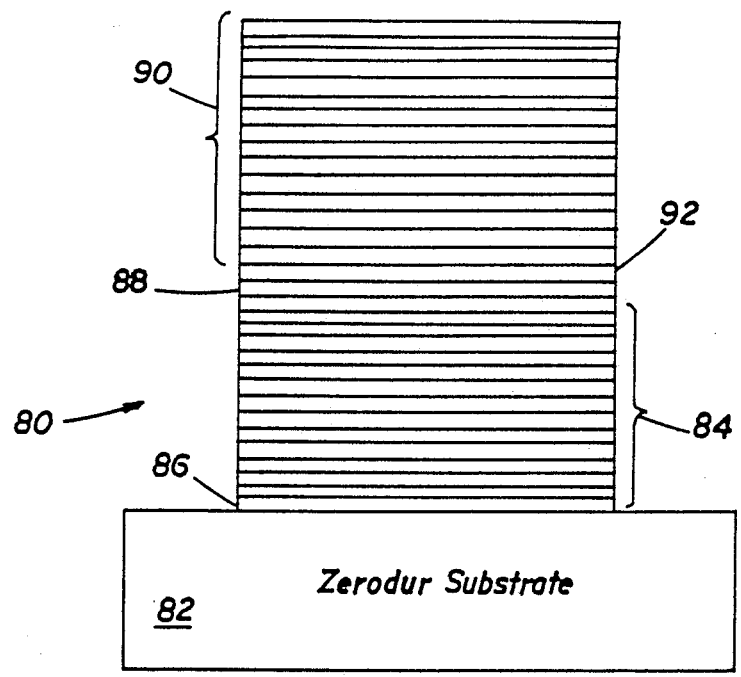
FIG. 7 is a cross-sectional view of an all dielectric mirror for use in the gyro of FIG. 1 adapted for suppressing S-polarized radiation.

As discussed above, the baseline magnetic mirror 30 shown in FIG. 2 was not configured to suppress the unwanted higher order, off-axis S-polarization radiation. Thus, when the magnetic mirror 30 of FIG. 2 is used in the gyro 10, one of the other mirrors should be configured to suppress the S-polarized radiation. Such an all-dielectric mirror is shown in FIG. 7. As with the magnetic mirrors of FIGS. 2 and 3, an all dielectric mirror 80 in FIG. 7 has a Zerodur substrate 82. Deposited on the Zerodur substrate 82 is a first stack 84 of seven pairs of TiO2/SiO2 having an optical thickness of 0.285 at a design wavelength of 1.017 microns for a mirror designed to operate at 1.15 microns. The alternating pairs in the stack 84 begin with a layer 86 of TiO2. A high index of refraction layer 88 of TiO2 having an optical thickness of 0.114 separates the first stack 84 from a second stack 90 which includes eight pairs of SiO2/TiO2 having an optical thickness of 0.25 and beginning with a layer 92 of SiO2. Note that the first stack 84 begins with the high index of refraction material TiO2 and the second stack 90 begins with the layer 92 of the low index of refraction material SiO2. This arrangement results in high P-polarized reflectance and a reduced S-polarized reflectance at the 1.15 microns operating wavelength of the gyro.

Figure 8:
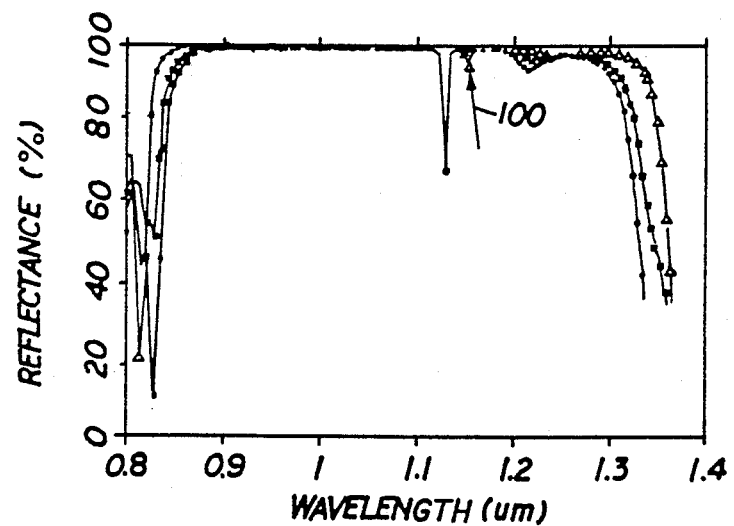
FIG. 8 is a graph of calculated reflectance for P- and S-polarized radiation of the mirror of FIG. 7.
Figure 9:
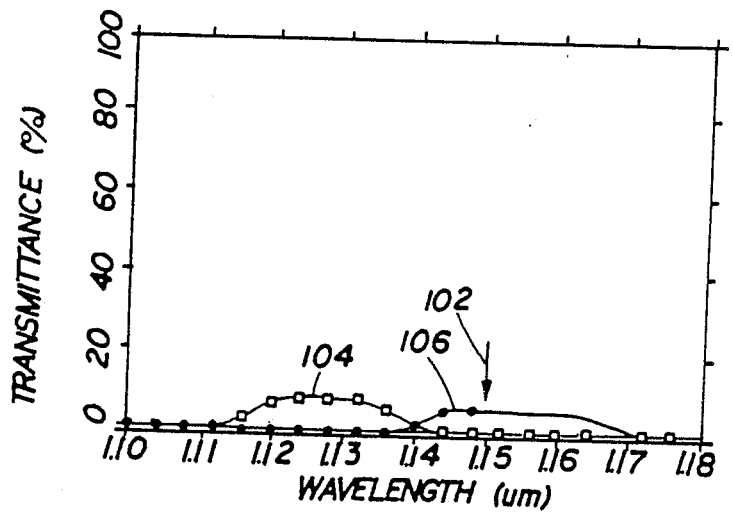
FIG. 9 is a graph of measured transmittance vs. wavelength for P- and S-polarized radiation for the mirror of FIG. 7.

FIG. 8 is a graph of the calculated performance of the all-dielectric mirror 80 of FIG. 7. An arrow 100 is located at the gyro operating wavelength of 1.15 microns. Note that there is a dip in the reflectance of the S-polarized light at this wavelength. At this same wavelength, the P-polarization reflectance is nearly 100%. This dip of several percent is enough so that the S-polarization radiation does not lase in the gyro cavity. FIG. 9 is another way of characterizing the performance of the all-dielectric mirror 80 of FIG. 7. FIG. 9 is the measured spectral transmittance of the mirror. An arrow 102 indicates the operating wavelength of 1.15 microns. A curve 104 represents spectral transmittance of the P-polarized radiation and a curve 106 represents transmittance of S-polarized radiation. Note that at the 1.15 microns operating frequency, the S-polarized light has loss and is transmitting so that the S-polarized light will not lase. On the other hand, the P-polarized light transmits very little and will therefore lase.

Figure 10:
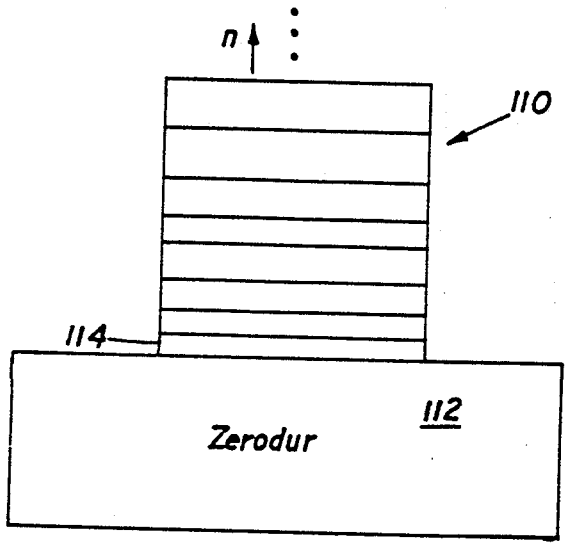
FIG. 10 is a cross-sectional view of a high reflectance mirror for use in the gyro of FIG. 1.

As discussed above in conjunction with FIG. 1 the laser gyro 10 includes three mirrors 20, 22, and 24. If the magnetic mirror 20 is configured as shown in FIG. 3 to suppress the S-polarization radiation, then the other two mirrors 22 and 24 can be a normal high reflectance mirror 110 shown in FIG. 10. If, on the other hand, the gyro 10 includes an all-dielectric mirror such as the mirror 80 of FIG. 7, only one of the normal high reflectance mirrors 110 would be used. The mirror 110 includes a Zerodur substrate 112 on which is deposited alternating layers of SiO2 and TiO2 beginning with an SiO2 layer 114. The layers have an optical thickness of 0.25 and fourteen or fifteen layers would normally be included. The mirror 110 has a high reflectance of approximately 99.9%.

Returning now to the all-dielectric mirror of FIG. 7, it should be noted that the two stacks 84 and 90 separated by the separating layer 88 have different optical thicknesses to support both constructive and destructive interference so that the unwanted S-polarization radiation is suppressed. The layers are made of oxides such as silicon dioxide and titanium dioxide which are durable enough to withstand exposure to the laser discharge.

What is claimed is:

1. Laser gyro comprising
   a gyro block including a block of material having bores therein at least partially defining a closed laser beam path lying in a plane;
   means for completing the laser beam path entirely enclosed within said block including a plurality of mirrors, each of which is contacted to the gyro block at the intersection of said bores to form a closed optical cavity therewith and laser beam path entirely enclosed within the block and mirrors and sealed to the block to form a laser gas containment cavity; and
   means for generating counter-rotating laser beams within the cavity;
   said path being free of intracavity elements so that the beam travels unimpeded through the bores by reflection from the mirrors;
   one of said mirrors or said block including means for discriminating against S-polarization with respect to P-polarization without using Brewster angle windows;
   one of said mirrors being constructed and arranged to form a magnetic mirror comprising a magnetic, saturable, fast-switching layer and a magneto-optic layer coupled to said magnetic layer to introduce a non-reciprocal phase shift between said counter-propagating light beams while maintaining negligible non-reciprocal losses, said last named mirror including
   a substrate;
   conductors disposed within said substrate for generating rapidly switchable magnetic fields;
   said magnetically saturable layer having a well defined easy axis of magnetization perpendicular to said plane and disposed on the substrate;
   said separate magneto-optic layer disposed directly on the magnetically saturable layer; and
   a multilayer dielectric reflective stack disposed over the magneto-optic layer.

2. The magnetic mirror of claim 1 wherein said conductors comprise a first pair of parallel conductors and a second pair of parallel conductors disposed orthogonally to said first pair of conductors.

3. The laser gyro of claim 1 wherein the magnetically saturable layer is a low magnetostriction alloy.

4. The laser gyro as in claim 3 wherein said low magnetostriction alloy has magnetostriction values of less than about 5 ppm and preferably less than about 1 ppm.

5. The laser gyro of claim 3 wherein the magnetically saturable layer is nickel-iron alloy of composition between 80-84 atomic percent nickel and the balance iron and preferrably 83 percent nickel.

6. The laser gyro of claim 1 wherein the magnetically saturable layer is a magnetic Ni-Fe alloy having a thickness of from 400-2,000 Angstroms.

7. The laser gyro of claim 1 wherein said magnetically saturable layer is a metal alloy consisting of Ni-Fe alloys of composition 80-84 percent nickel.

8. The laser gyro of claim 1 wherein said magneto-optic layer is made of a metal alloy selected from the group consisting of (a) Co/Fe or composition about 45+/−5 atomic percent cobalt,
   (b) Si/Fe or composition about 10+/−5 atomic percent silicon,
   (c) iron, and
   (d) Ni/Co approx 50/50 atomic percent.

9. The laser gyro of claim 1 wherein the magneto-optic layer is made of an iron or iron silicon alloy of between 10+/−5 atomic percent silicon and the balance iron.

10. The laser gyro of claim 1 wherein the magneto-optic layer is iron and is less than about 200 Angstroms thick.

11. The laser gyro of claim 1 wherein the magneto-optic layer is a cobalt/iron alloy of approximate composition of 45+/−5 atomic percent cobalt, with the balance iron and a thickness of about 100-300 Angstroms.

12. The laser gyro of claim 1 wherein the magneto-optic layer is an iron/silicon alloy of approximate composition of about 12+/−5 atomic percent silicon and a thickness of about from 100-400 Angstroms.

13. Magnetic mirror comprising:
    a substrate;
    conductors disposed in said substrate for generating rapidly switchable magnetic fields;
    a magnetically saturable layer having a well defined easy axis of magnetization disposed on the substrate;
    a magneto-optic layer disposed directly on the magnetically saturable layer; and
    a multilayer dielectric stack over the magneto-optic layer.

14. The magnetic mirror of claim 13 wherein the magnetically saturable layer is a low magnetostriction alloy.

15. The magnetic mirror of claim 13 wherein the magneto-optic layer is iron.

16. The magnetic mirror of claim 13 where the magneto-optic layer is a cobalt/iron alloy.

17. The magnetic mirror of claim 13 wherein the magneto-optic layer is an iron/silicon alloy of about 10+/−5 atomic percent silicon.

18. The magnetic mirror of claim 13 wherein said conductors comprise a first pair of parallel conductors and a second pair of parallel conductors disposed orthogonally to said first pair of conductors.

19. The magnetic mirror of claim 14 wherein the alloy is Ni-Fe alloy.

20. The magnetic mirror of claim 13 wherein the multilayer dielectric stack includes a first stack of alternating high and low index of refraction materials separated from the magneto-optic layer by a matching layer;
    a second stack of alternating layers of a high and a low index of refraction material; and
    an additional layer separating said stacks, said additional layer being adjusted to cooperate with said two stacks to selectively discriminate against the S-polarization mode of propagation.

21. The magnetic mirror of claim 20 wherein the alternating high and low index of refraction materials are titanium dioxide and silicon dioxide.

22. The magnetic mirror of claim 20 wherein the layers in the first stack have an optical thickness of 0.2653 and the layers in the second stack have an optical thickness of 0.2228 and the separating layer has an optical thickness of 0.0689

23. Laser gyro comprising:

a gyro block including a block of material having bores therein at least partially defining a closed laser beam path lying in a plane;

means for completing the laser beam path entirely enclosed within said block including a plurality of mirrors, each of which is contacted to the gyro block at he intersection of said bores to form a closed optical cavity therewith and laser beam path entirely enclosed within the block and mirrors and sealed to the block to form a laser gas containment cavity;

means for generating counter-rotating laser beams within the cavity;

said path being free of intracavity elements so that the beam travels unimpeded through the bores by reflection from the mirrors;

said block including means for discriminating against S-polarization with respect to P-polarization without using Brewster angle windows and including an odd number of mirrors and having a perimeter selected to produce a large frequency splitting between S- and P modes whereby S mode lasing is suppressed, and one of said mirrors being constructed and arranged to form a magnetic mirror to introduce a non-reciprocal phase shift between counter-propagating light beams while introducing negligible non-reciprocal losses.

24. The magnetic mirror of claim 23 having a perimeter less than 30 centimeters and operating on the 1.15 micron transition of neon in a helium neon lasing medium.

25. In a ring laser gyro with no intracavity elements a polygonal block, means forming mirror supporting facets formed at the apexes of the polygon, means forming a plurality of passages between facets to define a planar path cavity whose length is such that the frequency separation between S and P modes is at least greater than the half width of the laser gain curve for the P mode, means forming a plurality of mirrors mounted to said facets one of which is a pathlength control mirror, one of which is a magnetic mirror which utilizes the transverse Kerr magneto-optic effect to achieve a magnetic bias; and one of which is a readout mirror.

26. The ring laser gyro of claim 25 further including: means to control the laser polarization.

27. The ring laser gyro of claim 26 further including a polarizer between the pathlength control beam and the pathlength control detector; the polarizer is oriented parallel to the plane of the laser.

28. The ring laser gyro of claim 26 further including a polarization selective mirror whose reflectance for P polarized light is greater than the reflectance for S polarized light.

29. The ring laser gyro of claim 25 in which said magnetic mirror has its magnetization vector set normal to the laser plane and in the plane of the mirror.

30. The ring laser gyro of claim 25 further including magnetic mirror means including magnetic coils located in close proximity to the coating of the magnetic mirror to act on the material of the magnetic mirror but located external to the cavity, said coils being constructed and arranged to give a magnetic field primarily parallel to the mirror plane, and perpendicular to the laser plane.

31. The ring laser gyro of claim 30 in which the magnetic field of one coil is perpendicular to the laser plane and the magnetic field of another coil is parallel to the laser plane.

32. The ring laser gyro of claim 30 in which the magnetic field of the coil is skew to the easy axis of the magnetic mirror to facilitate rotational switching.

33. The ring laser gyro of claim 30 further including an electronic drive system to provide a current sufficient to drive the magnetic coating into saturation in a direction perpendicular to the plane of the laser and in the plane of the mirror.

34. The ring laser gyro of claim 30 further including current which produces a field greater than the coercive force so as to switch the magnetization of the coating to both the positive and negative direction of magnetization.

35. The ring laser gyro of claim 30 further including a periodic or aperiodic pulsed current which produces a field less than the coercive force perpendicular to the laser plane, and simultaneously a pulse in another coil which produces a transverse field so as to induce rotational switching of the magnetization.

36. The ring laser gyro as in claim 35 including a polarization selective mirror the dielectric coating of which has two sets of layer pairs separated by a spacer layer such that at the laser wavelength and at the gyro angle of incidence the reflectance for P polarized light is greater than the reflectance for SL polarized light.

37. The ring laser gyro as in claim 25 further including means for controlling the off-axis S mode polarization.

38. The ring laser gyro as in claim 37 in which said controlling means includes means forming an elliptical aperature placed around the beam path so as to block said off-axis S mode beam.

39. Laser gyro comprising:

a gyro block including a block of material having bores therein at least partially defining a closed laser beam path lying in a plane;

means for completing the laser beam path entirely enclosed within said block including a plurality of mirrors, each of which is contacted to the gyro block at the intersection of said bores to form a closed optical cavity therewith. The laser beam path entirely enclosed within the block and mirrors and sealed to the block to form a laser gas containment cavity;

means for generating counter-propagating laser beams within the cavity;

said path being free of intracavity elements so that the beam travels unimpeded through the bores by reflection from the mirors;

one of said mirrors having high reflectance and including constructive and destructive interference means for discriminating against S-polarization with respect to P-polarization without using Brewster angle windows;

one of said mirrors being constructed and arranged to form a magnetic mirror to introduce a non-reciprocal phase shift between said counter-propagating light beams while maintaining negligible non-reciprocal losses.

40. The laser gyro of claim 39 wherein the high reflectance mirror comprises a first multilayer dielectric stack including alternating layers of a high and a low index of refraction material, a second stack of alternating layers of high and low index of refraction material, and an additional layer separating the first and second stacks, said additional layer being adjusted to cooperate with said stacks to constructively and destructively interfere with the passing beams to thereby selectively discriminate against the S-polarization mode of propagation.

41. The laser gyro of claim 40 wherein the layers of the first stack have an optical thickness of 0.285 and the layers of the second stack have an optical thickness of 0.25 separated by a layer having an optical thickness of 0.114.

42. The laser gyro of claim 40 wherein the first stack includes seven pairs of layers and the second stack includes eight pairs of layers.

43. Laser gyro comprising:
a gyro block including a block of material having bores therein at least partially defining a closed laser beam path lying in a plane;
means for completing the laser beam path entirely enclosed within said block including a plurality of mirrors, each of which is contacted to the gyro block at the intersection of said bores to form a closed optical cavity therewith and laser beam path entirely enclosed within the block and mirrors and sealed to the block to form a laser gas containment cavity;
means for generating counter-propagating laser beams within the cavity;
said path being free of intracavity elements so that the beam travels unimpeded through the bores by reflection from the mirrors;
one of said mirrors including constructive and destructive interference means for discriminating against S-polarization with respect to P-polarization without using Brewster angle windows;
one of said mirrors being constructed and arranged to from a magnetic mirror comprising a magnetic, saturable, fast-switching layer and a magneto-optic layer coupled to said magnetic layer to introduce a non-reciprocal phase shift between said counter-propagating light beams while introducing negligible non-reciprocal losses.

44. The laser gyro of claim 43 wherein the magnetic mirror comprises
a substrate including conductors for generating rapidly switchable magnetic field;
said magnetically saturable layer being disposed on the substrate;
said magneto-optic layer being disposed directly on the magnetically saturable layer; and further including
a first stack of alternating layers of a high and a low index of refraction dielectric material disposed on the magneto-optic layer;
a second stack including alternating layers of a high and a low index of refraction material; and
an additional layer separating said stacks, said additional layer being adjusted to cooperate with said two stacks to selectively discriminate against the S-polarization mode of propagation.

45. The laser gyro of claim 44 wherein the stacks of alternating layers are made of silicon dioxide and titanium dioxide and wherein the layers in the second stack have an optical thickness of 0.2228 separated by a layer of titanium dioxide having an optical thickness of 0.0689.

46. The laser gyro of claim 43 wherein the magnetic mirror comprises
a substrate;
conductors disposed within said substrate for generating rapidly switchable magnetic fields,
said magnetically saturable layer having a well defined easy axis of magnetization perpendicular to said plane and disposed on the substrate,
said magneto-optic layer disposed directly on the magnetically saturable layer, and
said interference means comprising a multilayer dielectric reflective stack disposed over the magneto-optic layer.

47. The laser gyro as in claim 16 wherein the magnetically saturable layer is a low magnetostriction alloy.

48. The laser gyro as in claim 46 wherein the magnetic-optic layer is iron.

49. The laser gyro as in claim 46 where the magneto-optic layer is a cobalt/iron alloy.

50. The laser gyro as in claim 46 wherein the magneto-optic layer is an iron/silicon alloy of about 10+/−5 atomic percent silicon.

51. The laser gyro as in claim 46 wherein the magnetically saturable layer is Ni-Fe alloy.

* * * * *